(12) United States Patent
Allard et al.

(10) Patent No.: US 11,577,446 B2
(45) Date of Patent: Feb. 14, 2023

(54) MOLDED GAS BARRIER PARTS FOR VACUUM INSULATED STRUCTURE

(71) Applicant: WHIRLPOOL CORPORATION, Benton Harbor, MI (US)

(72) Inventors: Paul B. Allard, Coloma, MI (US); Dustin M. Miller, South Bend, IN (US); Subrata Shannigrahi, Pune (IN); Hua Liu, Newport News, VA (US)

(73) Assignee: Whirlpool Corporation, Benton Harbor, MI (US)

( * ) Notice: Subject to any disclaimer, the term of this patent is extended or adjusted under 35 U.S.C. 154(b) by 22 days.

(21) Appl. No.: 17/018,271

(22) Filed: Sep. 11, 2020

(65) Prior Publication Data

US 2020/0406527 A1 Dec. 31, 2020

Related U.S. Application Data

(60) Division of application No. 16/016,102, filed on Jun. 22, 2018, now Pat. No. 10,807,298, which is a
(Continued)

(51) Int. Cl.
*B29C 51/02* (2006.01)
*B29C 51/06* (2006.01)
(Continued)

(52) U.S. Cl.
CPC .............. *B29C 51/02* (2013.01); *B29C 51/06* (2013.01); *B29C 51/082* (2013.01);
(Continued)

(58) Field of Classification Search
CPC ....... B29C 51/02; B29C 51/06; B29C 51/082; B29C 2791/001; B65D 81/3806;
(Continued)

(56) References Cited

U.S. PATENT DOCUMENTS

| 948,541 A | 2/1910 | Coleman |
| 1,275,511 A | 8/1918 | Welch |

(Continued)

FOREIGN PATENT DOCUMENTS

| CA | 626838 A | 5/1961 |
| CA | 1320631 | 7/1993 |

(Continued)

OTHER PUBLICATIONS

KitchenAid, "Refrigerator user instructions," Sep. 5, 2015, 120 pages.
(Continued)

*Primary Examiner* — Emmanuel E Duke
(74) *Attorney, Agent, or Firm* — Price Heneveld LLP

(57) ABSTRACT

A vacuum insulated appliance structure, comprising: a first layer of a first polymer material. A second layer of a second polymer material is molded to (e.g. over) at least a portion of the first layer, and a third layer of a third polymer material is molded to (e.g. over) at least a portion of the second layer to form a first component. At least one of the layers is impervious to one or more gasses. One or more additional components are secured to the first component to form a vacuum cavity. The vacuum cavity is filled with a porous material, and the vacuum cavity is evacuated to form a vacuum.

8 Claims, 7 Drawing Sheets

Related U.S. Application Data continuation-in-part of application No. 14/982,652, filed on Dec. 29, 2015, now Pat. No. 10,030,905.

(51) Int. Cl.
| | |
|---|---|
| *B29C 51/08* | (2006.01) |
| *B65D 81/38* | (2006.01) |
| *F25D 23/06* | (2006.01) |
| *B29K 101/12* | (2006.01) |
| *B29K 105/04* | (2006.01) |
| *B29L 31/00* | (2006.01) |
| *F25D 23/08* | (2006.01) |

(52) U.S. Cl.
CPC ..... *B65D 81/3806* (2013.01); *B65D 81/3823* (2013.01); *F25D 23/064* (2013.01); *F25D 23/065* (2013.01); *B29C 2791/001* (2013.01); *B29K 2101/12* (2013.01); *B29K 2105/04* (2013.01); *B29K 2995/0067* (2013.01); *B29L 2031/7622* (2013.01); *F25D 23/085* (2013.01); *F25D 2201/1262* (2013.01); *F25D 2201/14* (2013.01)

(58) Field of Classification Search
CPC . B65D 81/3823; F25D 23/064; F25D 23/065; F25D 23/085; F25D 2201/1262; F25D 2201/14; B29K 2101/12; B29K 2105/04; B29K 2995/0067; B29L 2031/7622; Y02B 40/00

See application file for complete search history.

(56) References Cited

U.S. PATENT DOCUMENTS

| | | |
|---|---|---|
| 1,849,369 A | 3/1932 | Frost |
| 1,921,576 A | 8/1933 | Muffly |
| 2,108,212 A | 2/1938 | Schellens |
| 2,128,336 A | 8/1938 | Torstensson |
| 2,164,143 A | 6/1939 | Munters |
| 2,191,659 A | 2/1940 | Hintze |
| 2,318,744 A | 5/1943 | Brown |
| 2,356,827 A | 8/1944 | Coss et al. |
| 2,432,042 A | 12/1947 | Richard |
| 2,439,602 A | 4/1948 | Heritage |
| 2,439,603 A | 4/1948 | Heritage |
| 2,451,884 A | 10/1948 | Stelzer |
| 2,538,780 A | 1/1951 | Hazard |
| 2,559,356 A | 7/1951 | Hedges |
| 2,644,605 A | 7/1953 | Palmer |
| 2,729,863 A | 1/1956 | Kurtz |
| 2,768,046 A | 10/1956 | Evans |
| 2,792,959 A | 5/1957 | Diamond et al. |
| 2,809,764 A | 10/1957 | Diamond |
| 2,817,123 A | 12/1957 | Jacobs |
| 2,942,438 A | 6/1960 | Schmeling |
| 2,985,075 A | 5/1961 | Knutsson-Hall |
| 3,086,830 A | 4/1963 | Malia |
| 3,125,388 A | 3/1964 | Constantini et al. |
| 3,137,900 A | 6/1964 | Carbary |
| 3,218,111 A | 11/1965 | Steiner |
| 3,258,883 A | 7/1966 | Companaro et al. |
| 3,290,893 A | 12/1966 | Haldopoulos |
| 3,338,451 A | 8/1967 | Kesling |
| 3,353,301 A | 11/1967 | Heilweil et al. |
| 3,353,321 A | 11/1967 | Heilweil et al. |
| 3,358,059 A | 12/1967 | Snyder |
| 3,379,481 A | 4/1968 | Fisher |
| 3,408,316 A | 10/1968 | Mueller et al. |
| 3,471,416 A | 10/1969 | Fijal |
| 3,597,850 A | 8/1971 | Jenkins |
| 3,607,169 A | 9/1971 | Coxe |
| 3,632,012 A | 1/1972 | Kitson |
| 3,633,783 A | 1/1972 | Aue |
| 3,634,971 A | 1/1972 | Kesling |
| 3,635,536 A | 1/1972 | Lackey et al. |
| 3,670,521 A | 6/1972 | Dodge, III et al. |
| 3,688,384 A | 9/1972 | Mizushima et al. |
| 3,768,687 A | 10/1973 | Spencer |
| 3,769,770 A | 11/1973 | Deschamps et al. |
| 3,862,880 A | 1/1975 | Feldman |
| 3,868,829 A | 3/1975 | Mann et al. |
| 3,875,683 A | 4/1975 | Waters |
| 3,910,658 A | 10/1975 | Lindenschmidt |
| 3,933,398 A | 1/1976 | Haag |
| 3,935,787 A | 2/1976 | Fisher |
| 4,005,919 A | 2/1977 | Hoge et al. |
| 4,006,947 A | 2/1977 | Haag et al. |
| 4,043,624 A | 8/1977 | Lindenschmidt |
| 4,050,145 A | 9/1977 | Benford |
| 4,067,628 A | 1/1978 | Sherburn |
| 4,118,266 A | 10/1978 | Kerr |
| 4,170,391 A | 10/1979 | Bottger |
| 4,242,241 A | 12/1980 | Rosen et al. |
| 4,260,876 A | 4/1981 | Hochheiser |
| 4,303,730 A | 12/1981 | Torobin |
| 4,303,732 A | 12/1981 | Torobin |
| 4,325,734 A | 4/1982 | Burrage et al. |
| 4,330,310 A | 5/1982 | Tate, Jr. et al. |
| 4,332,429 A | 6/1982 | Frick et al. |
| 4,396,362 A | 8/1983 | Thompson et al. |
| 4,417,382 A | 11/1983 | Schilf |
| 4,492,368 A | 1/1985 | DeLeeuw et al. |
| 4,529,368 A | 7/1985 | Makansi |
| 4,548,196 A | 10/1985 | Torobin |
| 4,583,796 A | 4/1986 | Nakajima et al. |
| 4,660,271 A | 4/1987 | Lenhardt |
| 4,671,909 A | 6/1987 | Torobin |
| 4,671,985 A | 6/1987 | Rodrigues et al. |
| 4,681,788 A | 7/1987 | Barito et al. |
| 4,745,015 A | 5/1988 | Cheng et al. |
| 4,777,154 A | 10/1988 | Torobin |
| 4,781,968 A | 11/1988 | Kellerman |
| 4,805,293 A | 2/1989 | Buchser |
| 4,865,875 A | 9/1989 | Kellerman |
| 4,870,735 A | 10/1989 | Jahr et al. |
| 4,914,341 A | 4/1990 | Weaver et al. |
| 4,917,841 A | 4/1990 | Jenkins |
| 4,951,652 A | 8/1990 | Ferrario et al. |
| 5,007,226 A | 4/1991 | Nelson |
| 5,017,436 A * | 5/1991 | Schwarz ........... B32B 27/32 428/517 |
| 5,018,328 A | 5/1991 | Cur et al. |
| 5,033,636 A | 7/1991 | Jenkins |
| 5,066,437 A | 11/1991 | Barito et al. |
| 5,076,984 A | 12/1991 | Bisplinghoff et al. |
| 5,082,335 A * | 1/1992 | Cur ........... E04B 1/803 62/DIG. 13 |
| 5,084,320 A | 1/1992 | Barito et al. |
| 5,094,899 A | 3/1992 | Rusek, Jr. |
| 5,118,174 A | 6/1992 | Benford et al. |
| 5,121,593 A | 6/1992 | Forslund |
| 5,157,893 A | 10/1992 | Benson et al. |
| 5,168,674 A | 12/1992 | Molthen |
| 5,171,346 A | 12/1992 | Hallett |
| 5,175,975 A | 1/1993 | Benson et al. |
| 5,212,143 A | 5/1993 | Torobin |
| 5,221,136 A | 6/1993 | Hauck et al. |
| 5,227,245 A | 7/1993 | Brands et al. |
| 5,231,811 A | 8/1993 | Andrepont et al. |
| 5,248,196 A | 9/1993 | Lynn et al. |
| 5,251,455 A | 10/1993 | Cur et al. |
| 5,252,408 A | 10/1993 | Bridges et al. |
| 5,263,773 A | 11/1993 | Gable et al. |
| 5,273,801 A | 12/1993 | Barry et al. |
| 5,318,108 A | 6/1994 | Benson et al. |
| 5,340,208 A | 8/1994 | Hauck et al. |
| 5,353,868 A | 10/1994 | Abbott |
| 5,359,795 A | 11/1994 | Mawby et al. |
| 5,375,428 A | 12/1994 | LeClear et al. |
| 5,397,759 A | 3/1995 | Torobin |
| 5,418,055 A | 5/1995 | Chen et al. |
| 5,433,056 A | 7/1995 | Benson et al. |

(56) References Cited

U.S. PATENT DOCUMENTS

| | | |
|---|---|---|
| 5,477,676 A | 12/1995 | Benson et al. |
| 5,500,287 A | 3/1996 | Henderson |
| 5,500,305 A | 3/1996 | Bridges et al. |
| 5,505,810 A | 4/1996 | Kirby et al. |
| 5,507,999 A | 4/1996 | Copsey et al. |
| 5,509,248 A | 4/1996 | Dellby et al. |
| 5,512,345 A * | 4/1996 | Tsutsumi ............... F25D 23/063 220/592.27 |
| 5,532,034 A | 7/1996 | Kirby et al. |
| 5,533,311 A | 7/1996 | Tirrell et al. |
| 5,562,154 A | 10/1996 | Benson et al. |
| 5,586,680 A | 12/1996 | Dellby et al. |
| 5,599,081 A | 2/1997 | Revlett et al. |
| 5,600,966 A | 2/1997 | Valence et al. |
| 5,632,543 A | 5/1997 | McGrath et al. |
| 5,640,828 A | 6/1997 | Reeves et al. |
| 5,643,485 A | 7/1997 | Potter et al. |
| 5,652,039 A | 7/1997 | Tremain et al. |
| 5,704,107 A | 1/1998 | Schmidt et al. |
| 5,716,581 A | 2/1998 | Tirrell et al. |
| 5,768,837 A | 6/1998 | Sjoholm |
| 5,792,539 A | 8/1998 | Hunter |
| 5,792,801 A | 8/1998 | Tsuda et al. |
| 5,813,454 A | 9/1998 | Potter |
| 5,826,780 A | 10/1998 | Nesser et al. |
| 5,827,385 A | 10/1998 | Meyer et al. |
| 5,834,126 A | 11/1998 | Sheu |
| 5,843,353 A | 12/1998 | DeVos et al. |
| 5,866,228 A * | 2/1999 | Awata ..................... B32B 1/06 428/69 |
| 5,866,247 A | 2/1999 | Klatt et al. |
| 5,868,890 A | 2/1999 | Fredrick |
| 5,900,299 A * | 5/1999 | Wynne ................... B65B 31/06 264/102 |
| 5,914,138 A | 6/1999 | Swenson |
| 5,918,478 A | 7/1999 | Bostic et al. |
| 5,924,295 A | 7/1999 | Park |
| 5,950,395 A | 9/1999 | Takemasa et al. |
| 5,952,404 A | 9/1999 | Simpson et al. |
| 5,966,963 A | 10/1999 | Kovalaske |
| 5,985,189 A | 11/1999 | Lynn et al. |
| 6,013,700 A | 1/2000 | Asano et al. |
| 6,037,033 A | 3/2000 | Hunter |
| 6,063,471 A | 5/2000 | Dietrich et al. |
| 6,094,922 A | 8/2000 | Ziegler |
| 6,109,712 A | 8/2000 | Haworth et al. |
| 6,128,914 A | 10/2000 | Tamaoki et al. |
| 6,132,837 A | 10/2000 | Boes et al. |
| 6,158,233 A | 12/2000 | Cohen et al. |
| 6,163,976 A | 12/2000 | Tada et al. |
| 6,164,030 A | 12/2000 | Dietrich |
| 6,164,739 A * | 12/2000 | Schulz ................... B32B 27/40 428/319.3 |
| 6,187,241 B1 | 2/2001 | Swenson |
| 6,187,256 B1 | 2/2001 | Aslan et al. |
| 6,209,342 B1 | 4/2001 | Banicevic et al. |
| 6,210,625 B1 | 4/2001 | Matsushita et al. |
| 6,217,140 B1 | 4/2001 | Hirath et al. |
| 6,220,473 B1 | 4/2001 | Lehman et al. |
| 6,221,456 B1 | 4/2001 | Pogorski et al. |
| 6,224,179 B1 | 5/2001 | Wenning et al. |
| 6,244,458 B1 * | 6/2001 | Frysinger ............... F25D 3/125 220/592.2 |
| 6,260,377 B1 | 7/2001 | Tamaoki et al. |
| 6,266,941 B1 | 7/2001 | Nishimoto |
| 6,266,970 B1 | 7/2001 | Nam et al. |
| 6,294,595 B1 | 9/2001 | Tyagi et al. |
| 6,305,768 B1 | 10/2001 | Nishimoto |
| 6,336,693 B2 | 1/2002 | Nishimoto |
| 6,485,122 B2 | 1/2002 | Wolf et al. |
| 6,350,401 B1 | 2/2002 | Gellert et al. |
| 6,390,378 B1 | 5/2002 | Briscoe, Jr. et al. |
| 6,406,449 B2 | 6/2002 | Moore et al. |
| 6,408,841 B1 | 6/2002 | Hirath et al. |
| 6,415,623 B1 | 7/2002 | Jennings et al. |
| 6,428,130 B1 | 8/2002 | Banicevic et al. |
| 6,430,780 B1 | 8/2002 | Kim et al. |
| 6,460,955 B1 | 10/2002 | Vaughan et al. |
| 6,519,919 B1 | 2/2003 | Takenouchi et al. |
| 6,596,213 B2 | 7/2003 | Swenson |
| 6,623,413 B1 | 9/2003 | Wynne |
| 6,629,429 B1 | 10/2003 | Kawamura et al. |
| 6,649,101 B2 | 11/2003 | Kermet |
| 6,651,444 B2 | 11/2003 | Morimoto et al. |
| 6,655,766 B2 | 12/2003 | Hodges |
| 6,689,840 B1 | 2/2004 | Eustace et al. |
| 6,716,501 B2 | 4/2004 | Kovalchuk et al. |
| 6,736,472 B2 | 5/2004 | Banicevic |
| 6,749,780 B2 | 6/2004 | Tobias |
| 6,773,082 B2 | 8/2004 | Lee |
| 6,858,280 B2 | 2/2005 | Allen et al. |
| 6,860,082 B1 | 3/2005 | Yamamoto et al. |
| 6,908,581 B2 | 6/2005 | Sabin et al. |
| 6,938,968 B2 | 9/2005 | Tanimoto et al. |
| 6,997,530 B2 | 2/2006 | Avendano et al. |
| 7,008,032 B2 | 3/2006 | Chekal et al. |
| 7,026,054 B2 | 4/2006 | Ikegawa et al. |
| 7,197,792 B2 | 4/2007 | Moon |
| 7,197,888 B2 | 4/2007 | LeClear et al. |
| 7,207,181 B2 | 4/2007 | Murray et al. |
| 7,210,308 B2 | 5/2007 | Tanimoto et al. |
| 7,234,247 B2 | 6/2007 | Maguire |
| 7,263,744 B2 | 9/2007 | Kim et al. |
| 7,278,279 B2 | 10/2007 | Hirai et al. |
| 7,284,390 B2 | 10/2007 | Van Meter et al. |
| 7,296,432 B2 | 11/2007 | Muller et al. |
| 7,306,446 B2 | 12/2007 | Sabin et al. |
| 7,316,125 B2 | 1/2008 | Uekado et al. |
| 7,343,757 B2 | 3/2008 | Egan et al. |
| 7,360,371 B2 | 4/2008 | Feinauer et al. |
| 7,386,992 B2 | 6/2008 | Adamski et al. |
| 7,399,442 B2 | 7/2008 | Sabin et al. |
| 7,449,227 B2 | 11/2008 | Echigoya et al. |
| 7,475,562 B2 | 1/2009 | Jackovin |
| 7,517,031 B2 | 4/2009 | Laible |
| 7,517,480 B2 | 4/2009 | Sabin et al. |
| 7,517,576 B2 | 4/2009 | Echigoya et al. |
| 7,537,817 B2 | 5/2009 | Tsunetsugu et al. |
| 7,571,582 B2 * | 8/2009 | Hirai ..................... F16L 59/065 428/69 |
| 7,614,244 B2 | 11/2009 | Venkatakrishnan et al. |
| 7,625,622 B2 | 12/2009 | Teckoe et al. |
| 7,641,298 B2 | 1/2010 | Hirath et al. |
| 7,665,326 B2 | 2/2010 | LeClear et al. |
| 7,703,217 B2 | 4/2010 | Tada et al. |
| 7,703,824 B2 | 4/2010 | Kittelson et al. |
| 7,757,511 B2 | 7/2010 | LeClear et al. |
| 7,762,634 B2 | 7/2010 | Tenra et al. |
| 7,794,805 B2 | 9/2010 | Aumaugher et al. |
| 7,815,269 B2 | 10/2010 | Wenning et al. |
| 7,842,269 B2 | 11/2010 | Schachtely et al. |
| 7,845,745 B2 | 12/2010 | Gorz et al. |
| 7,861,538 B2 | 1/2011 | Welle et al. |
| 7,886,559 B2 | 2/2011 | Hell et al. |
| 7,893,123 B2 | 2/2011 | Luisi |
| 7,908,873 B1 | 3/2011 | Cur et al. |
| 7,930,892 B1 | 4/2011 | Vonderhaar |
| 7,938,148 B2 | 5/2011 | Carlier et al. |
| 7,939,179 B2 | 5/2011 | DeVos et al. |
| 7,992,257 B2 | 8/2011 | Kim |
| 8,049,518 B2 | 11/2011 | Wern et al. |
| 8,074,469 B2 | 12/2011 | Hamel et al. |
| 8,079,652 B2 | 12/2011 | Laible et al. |
| 8,083,985 B2 | 12/2011 | Luisi et al. |
| 8,108,972 B2 | 2/2012 | Bae et al. |
| 8,113,604 B2 | 2/2012 | Olson et al. |
| 8,117,865 B2 | 2/2012 | Allard et al. |
| 8,157,338 B2 | 4/2012 | Seo et al. |
| 8,162,415 B2 | 4/2012 | Hagele et al. |
| 8,163,080 B2 | 4/2012 | Meyer et al. |
| 8,176,746 B2 | 5/2012 | Allard et al. |
| 8,182,051 B2 | 5/2012 | Laible et al. |
| 8,197,019 B2 | 6/2012 | Kim |

(56) References Cited

U.S. PATENT DOCUMENTS

| | | | |
|---|---|---|---|
| 8,202,599 B2 | 6/2012 | Henn |
| 8,211,523 B2 | 7/2012 | Fujimori et al. |
| 8,266,923 B2 | 9/2012 | Bauer et al. |
| 8,281,558 B2 | 10/2012 | Hiemeyer et al. |
| 8,299,545 B2 | 10/2012 | Chen et al. |
| 8,343,395 B2 | 1/2013 | Hu et al. |
| 8,353,177 B2 | 1/2013 | Adamski et al. |
| 8,382,219 B2 | 2/2013 | Hottmann et al. |
| 8,434,317 B2 | 5/2013 | Besore |
| 8,435,434 B1 | 5/2013 | Swenson |
| 8,439,460 B2 | 5/2013 | Laible et al. |
| 8,453,476 B2 | 6/2013 | Kendall et al. |
| 8,456,040 B2 | 6/2013 | Allard et al. |
| 8,486,215 B2 | 7/2013 | Amann |
| 8,491,070 B2 | 7/2013 | Davis et al. |
| 8,491,290 B2 | 7/2013 | Swenson |
| 8,516,845 B2 | 8/2013 | Wuesthoff et al. |
| 8,522,563 B2 | 9/2013 | Allard et al. |
| 8,528,284 B2 | 9/2013 | Aspenson et al. |
| 8,590,992 B2 | 11/2013 | Lim et al. |
| 8,717,029 B2 | 5/2014 | Chae et al. |
| 8,726,690 B2 | 5/2014 | Cur et al. |
| 8,733,123 B2 | 5/2014 | Adamski et al. |
| 8,739,567 B2 | 6/2014 | Junge |
| 8,739,568 B2 | 6/2014 | Allard et al. |
| 8,752,918 B2 | 6/2014 | Kang |
| 8,752,921 B2 | 6/2014 | Gorz et al. |
| 8,756,952 B2 | 6/2014 | Adamski et al. |
| 8,763,847 B2 | 7/2014 | Mortarotti |
| 8,764,133 B2 | 7/2014 | Park et al. |
| 8,770,682 B2 | 7/2014 | Lee et al. |
| 8,776,390 B2 | 7/2014 | Hanaoka et al. |
| 8,790,477 B2 | 7/2014 | Tenra et al. |
| 8,801,991 B2 | 8/2014 | Swenson |
| 8,840,204 B2 | 9/2014 | Bauer et al. |
| 8,852,708 B2 * | 10/2014 | Kim .................. F16L 59/07 428/69 |
| 8,871,323 B2 | 10/2014 | Kim et al. |
| 8,881,398 B2 | 10/2014 | Hanley et al. |
| 8,899,068 B2 | 12/2014 | Jung et al. |
| 8,905,503 B2 | 12/2014 | Sahasrabudhe et al. |
| 8,927,084 B2 | 1/2015 | Jeon et al. |
| 8,943,770 B2 | 2/2015 | Sanders et al. |
| 8,944,541 B2 | 2/2015 | Allard et al. |
| 8,986,483 B2 | 3/2015 | Cur et al. |
| 9,009,969 B2 | 4/2015 | Choi et al. |
| RE45,501 E | 5/2015 | Maguire |
| 9,038,403 B2 | 5/2015 | Cur et al. |
| 9,056,952 B2 | 6/2015 | Eilbracht et al. |
| 9,062,480 B2 | 6/2015 | Litch |
| 9,071,907 B2 | 6/2015 | Kuehl et al. |
| 9,074,811 B2 | 7/2015 | Korkmaz |
| 9,080,808 B2 | 7/2015 | Choi et al. |
| 9,102,076 B2 | 8/2015 | Doshi et al. |
| 9,103,482 B2 | 8/2015 | Fujimori et al. |
| 9,114,906 B2 | 8/2015 | Swenson |
| 9,125,546 B2 | 9/2015 | Kleemann et al. |
| 9,140,480 B2 | 9/2015 | Kuehl et al. |
| 9,140,481 B2 | 9/2015 | Cur et al. |
| 9,170,045 B2 | 10/2015 | Oh et al. |
| 9,170,046 B2 | 10/2015 | Jung et al. |
| 9,182,158 B2 | 11/2015 | Wu |
| 9,188,382 B2 | 11/2015 | Kim et al. |
| 8,955,352 B2 | 12/2015 | Lee et al. |
| 9,221,204 B2 | 12/2015 | Swenson |
| 9,221,210 B2 | 12/2015 | Wu et al. |
| 9,227,349 B2 | 1/2016 | Swenson |
| 9,228,386 B2 | 1/2016 | Thielmann et al. |
| 9,252,570 B2 | 2/2016 | Allard et al. |
| 9,267,727 B2 | 2/2016 | Lim et al. |
| 9,303,915 B2 | 4/2016 | Kim et al. |
| 9,328,951 B2 | 5/2016 | Shin et al. |
| 9,353,984 B2 | 5/2016 | Kim et al. |
| 9,409,333 B2 | 8/2016 | Swenson |
| 9,410,732 B2 | 8/2016 | Choi et al. |
| 9,423,171 B2 | 8/2016 | Betto et al. |
| 9,429,356 B2 | 8/2016 | Kim et al. |
| 9,448,004 B2 | 9/2016 | Kim et al. |
| 9,463,917 B2 | 10/2016 | Wu et al. |
| 9,482,463 B2 | 11/2016 | Choi et al. |
| 9,493,269 B2 | 11/2016 | Swenson |
| 9,506,689 B2 | 11/2016 | Carbajal et al. |
| 9,511,526 B2 | 12/2016 | Sweetland |
| 9,518,777 B2 | 12/2016 | Lee et al. |
| 9,568,238 B2 | 2/2017 | Kim et al. |
| D781,641 S | 3/2017 | Incukur |
| D781,642 S | 3/2017 | Incukur |
| 9,592,652 B2 | 3/2017 | Swenson |
| 9,605,891 B2 | 3/2017 | Lee et al. |
| 9,696,085 B2 | 7/2017 | Seo et al. |
| 9,701,047 B2 | 7/2017 | Swenson |
| 9,702,621 B2 | 7/2017 | Cho et al. |
| 9,759,479 B2 | 9/2017 | Ramm et al. |
| 9,777,958 B2 | 10/2017 | Choi et al. |
| 9,791,204 B2 | 10/2017 | Kim et al. |
| 9,833,942 B2 | 12/2017 | Wu et al. |
| 9,862,128 B2 | 1/2018 | Duffy et al. |
| 9,927,169 B2 | 3/2018 | Baker et al. |
| 9,976,753 B2 | 5/2018 | Hynes |
| 10,017,314 B2 | 7/2018 | Swenson et al. |
| 10,024,544 B2 | 7/2018 | Bhogal et al. |
| 10,065,348 B2 | 9/2018 | Engelmann et al. |
| 10,077,342 B2 | 9/2018 | An et al. |
| 10,144,161 B2 | 12/2018 | Duffy et al. |
| 10,213,944 B2 | 2/2019 | Swenson |
| 2002/0004111 A1 | 1/2002 | Matsubara et al. |
| 2002/0114937 A1 | 8/2002 | Albert et al. |
| 2002/0144482 A1 | 10/2002 | Henson et al. |
| 2002/0168496 A1 | 11/2002 | Morimoto et al. |
| 2003/0008100 A1 | 1/2003 | Horn |
| 2003/0041612 A1 | 3/2003 | Piloni et al. |
| 2003/0056334 A1 | 3/2003 | Finkelstein |
| 2003/0157284 A1 | 8/2003 | Tanimoto et al. |
| 2003/0167789 A1 | 9/2003 | Tanimoto et al. |
| 2003/0173883 A1 | 9/2003 | Koons |
| 2004/0144130 A1 | 7/2004 | Jung |
| 2004/0178707 A1 | 9/2004 | Avendano |
| 2004/0180176 A1 | 9/2004 | Rusek |
| 2004/0226141 A1 | 11/2004 | Yates et al. |
| 2004/0253406 A1 | 12/2004 | Hayashi et al. |
| 2005/0042247 A1 | 2/2005 | Gomoll et al. |
| 2005/0229614 A1 | 10/2005 | Ansted |
| 2005/0235682 A1 | 10/2005 | Hirai et al. |
| 2006/0064846 A1 | 3/2006 | Espendola et al. |
| 2006/0076863 A1 | 4/2006 | Echigoya et al. |
| 2006/0088685 A1 * | 4/2006 | Echigoya .............. F16L 59/065 428/69 |
| 2006/0201189 A1 | 9/2006 | Adamski et al. |
| 2006/0261718 A1 | 11/2006 | Miseki et al. |
| 2006/0263571 A1 * | 11/2006 | Tsunetsugu ........ G03G 15/2053 428/69 |
| 2006/0266075 A1 | 11/2006 | Itsuki et al. |
| 2007/0001563 A1 | 1/2007 | Park et al. |
| 2007/0099502 A1 | 5/2007 | Ferinauer |
| 2007/0176526 A1 | 8/2007 | Gomoll et al. |
| 2007/0266654 A1 | 11/2007 | Noale |
| 2008/0044488 A1 | 2/2008 | Zimmer et al. |
| 2008/0048540 A1 | 2/2008 | Kim |
| 2008/0138458 A1 | 6/2008 | Ozasa et al. |
| 2008/0196441 A1 | 8/2008 | Ferreira |
| 2008/0300356 A1 | 12/2008 | Meyer et al. |
| 2008/0309210 A1 | 12/2008 | Luisi et al. |
| 2009/0032541 A1 | 2/2009 | Rogala et al. |
| 2009/0056367 A1 | 3/2009 | Neumann |
| 2009/0058244 A1 | 3/2009 | Cho et al. |
| 2009/0113925 A1 | 5/2009 | Korkmaz |
| 2009/0131571 A1 | 5/2009 | Fraser et al. |
| 2009/0179541 A1 | 7/2009 | Smith et al. |
| 2009/0191480 A1 * | 7/2009 | Rogers .................... G03C 1/73 430/283.1 |
| 2009/0205357 A1 | 8/2009 | Lim et al. |
| 2009/0208717 A1 | 8/2009 | Enzinger et al. |
| 2009/0302728 A1 | 12/2009 | Rotter et al. |
| 2009/0322470 A1 | 12/2009 | Yoo et al. |

(56) References Cited

U.S. PATENT DOCUMENTS

| | | |
|---|---|---|
| 2009/0324871 A1 | 12/2009 | Henn |
| 2010/0170279 A1 | 7/2010 | Aoki |
| 2010/0206464 A1 | 8/2010 | Heo et al. |
| 2010/0218543 A1 | 9/2010 | Duchame |
| 2010/0231109 A1 | 9/2010 | Matzke et al. |
| 2010/0287842 A1 | 11/2010 | Oh |
| 2010/0287843 A1 | 11/2010 | Oh |
| 2010/0287974 A1 | 11/2010 | Cur et al. |
| 2010/0293984 A1 | 11/2010 | Adamski et al. |
| 2010/0295435 A1 | 11/2010 | Kendall et al. |
| 2011/0011119 A1 | 1/2011 | Kuehl et al. |
| 2011/0023527 A1 | 2/2011 | Kwon et al. |
| 2011/0030894 A1 | 2/2011 | Tenra et al. |
| 2011/0095669 A1 | 4/2011 | Moon et al. |
| 2011/0146325 A1 | 6/2011 | Lee |
| 2011/0146335 A1 | 6/2011 | Jung et al. |
| 2011/0165367 A1* | 7/2011 | Kojima .................. E04B 1/803 156/182 |
| 2011/0215694 A1 | 9/2011 | Fink et al. |
| 2011/0220662 A1 | 9/2011 | Kim et al. |
| 2011/0241513 A1 | 10/2011 | Nomura et al. |
| 2011/0241514 A1 | 10/2011 | Nomura et al. |
| 2011/0260351 A1 | 10/2011 | Corradi et al. |
| 2011/0290808 A1 | 12/2011 | Bai et al. |
| 2011/0309732 A1 | 12/2011 | Horil et al. |
| 2011/0315693 A1 | 12/2011 | Cur et al. |
| 2012/0000234 A1 | 1/2012 | Adamski et al. |
| 2012/0011879 A1 | 1/2012 | Gu |
| 2012/0060544 A1 | 3/2012 | Lee et al. |
| 2012/0099255 A1 | 4/2012 | Lee et al. |
| 2012/0103006 A1 | 5/2012 | Jung et al. |
| 2012/0104923 A1 | 5/2012 | Jung et al. |
| 2012/0118002 A1* | 5/2012 | Kim ....................... F16L 59/065 428/69 |
| 2012/0137501 A1 | 6/2012 | Allard et al. |
| 2012/0152151 A1 | 6/2012 | Meyer et al. |
| 2012/0196059 A1 | 8/2012 | Fujimori et al. |
| 2012/0202049 A1 | 8/2012 | Valladeau et al. |
| 2012/0231204 A1 | 9/2012 | Jeon et al. |
| 2012/0237715 A1 | 9/2012 | McCracken |
| 2012/0240612 A1 | 9/2012 | Wusthoff et al. |
| 2012/0273111 A1 | 11/2012 | Nomura et al. |
| 2012/0279247 A1 | 11/2012 | Katu et al. |
| 2012/0280608 A1 | 11/2012 | Park et al. |
| 2012/0285971 A1 | 11/2012 | Junge et al. |
| 2012/0297813 A1* | 11/2012 | Hanley ................. B29C 44/065 62/331 |
| 2012/0324937 A1 | 12/2012 | Adamski et al. |
| 2013/0026900 A1 | 1/2013 | Oh et al. |
| 2013/0043780 A1 | 2/2013 | Ootsuka et al. |
| 2013/0068990 A1 | 3/2013 | Eilbracht et al. |
| 2013/0111941 A1 | 5/2013 | Yu et al. |
| 2013/0221819 A1 | 8/2013 | Wing |
| 2013/0255304 A1 | 10/2013 | Cur et al. |
| 2013/0256318 A1* | 10/2013 | Kuehl ................... F25D 23/028 220/592.09 |
| 2013/0256319 A1 | 10/2013 | Kuehl et al. |
| 2013/0257256 A1 | 10/2013 | Allard et al. |
| 2013/0257257 A1 | 10/2013 | Cur et al. |
| 2013/0264439 A1 | 10/2013 | Allard et al. |
| 2013/0270732 A1 | 10/2013 | Wu et al. |
| 2013/0285527 A1 | 10/2013 | Choi et al. |
| 2013/0293080 A1 | 11/2013 | Kim et al. |
| 2013/0305535 A1* | 11/2013 | Cur ......................... F25B 39/02 29/890.035 |
| 2013/0328472 A1 | 12/2013 | Shim et al. |
| 2014/0009055 A1 | 1/2014 | Cho et al. |
| 2014/0047775 A1 | 2/2014 | Litch |
| 2014/0097733 A1 | 4/2014 | Seo et al. |
| 2014/0132144 A1 | 5/2014 | Kim et al. |
| 2014/0166926 A1 | 6/2014 | Lee et al. |
| 2014/0171578 A1 | 6/2014 | Meyer et al. |
| 2014/0190978 A1 | 7/2014 | Bowman et al. |
| 2014/0196305 A1 | 7/2014 | Smith |
| 2014/0216706 A1 | 8/2014 | Melton et al. |
| 2014/0232250 A1 | 8/2014 | Kim et al. |
| 2014/0260332 A1 | 9/2014 | Wu |
| 2014/0311667 A1 | 10/2014 | Siudzinski et al. |
| 2014/0346942 A1* | 11/2014 | Kim ....................... F25D 23/064 29/530 |
| 2014/0364527 A1 | 12/2014 | Matthias et al. |
| 2015/0011668 A1 | 1/2015 | Kolb et al. |
| 2015/0015133 A1 | 1/2015 | Carbajal et al. |
| 2015/0017386 A1 | 1/2015 | Kolb et al. |
| 2015/0027628 A1 | 1/2015 | Cravens et al. |
| 2015/0047624 A1 | 2/2015 | Luckhardt et al. |
| 2015/0059399 A1 | 3/2015 | Hwang et al. |
| 2015/0059499 A1 | 3/2015 | Hwang et al. |
| 2015/0115790 A1 | 4/2015 | Ogg |
| 2015/0118435 A1* | 4/2015 | Kimura .................. E04B 1/803 156/60 |
| 2015/0147514 A1* | 5/2015 | Shinohara ............. B29C 43/203 428/69 |
| 2015/0159936 A1 | 6/2015 | Oh et al. |
| 2015/0168050 A1 | 6/2015 | Cur et al. |
| 2015/0176888 A1 | 6/2015 | Cur et al. |
| 2015/0184923 A1 | 7/2015 | Jeon |
| 2015/0190840 A1 | 7/2015 | Muto et al. |
| 2015/0224685 A1 | 8/2015 | Amstutz |
| 2015/0241115 A1 | 8/2015 | Strauss et al. |
| 2015/0241118 A1 | 8/2015 | Wu |
| 2015/0285551 A1 | 10/2015 | Aiken et al. |
| 2016/0084567 A1 | 3/2016 | Fernandez et al. |
| 2016/0116100 A1 | 4/2016 | Thiery et al. |
| 2016/0123055 A1 | 5/2016 | Ueyama |
| 2016/0161175 A1 | 6/2016 | Benold et al. |
| 2016/0178267 A1 | 6/2016 | Hao et al. |
| 2016/0178269 A1 | 6/2016 | Hiemeyer et al. |
| 2016/0235201 A1 | 8/2016 | Soot |
| 2016/0240839 A1 | 8/2016 | Umeyama et al. |
| 2016/0258671 A1 | 9/2016 | Allard et al. |
| 2016/0290702 A1 | 10/2016 | Sexton et al. |
| 2016/0348957 A1 | 12/2016 | Hitzelberger et al. |
| 2017/0038126 A1 | 2/2017 | Lee et al. |
| 2017/0157809 A1 | 6/2017 | Deka et al. |
| 2017/0159942 A1 | 6/2017 | Ivanovic et al. |
| 2017/0176086 A1 | 6/2017 | Kang |
| 2017/0184339 A1 | 6/2017 | Liu et al. |
| 2017/0191746 A1 | 7/2017 | Seo |

FOREIGN PATENT DOCUMENTS

| | | |
|---|---|---|
| CA | 2259665 | 1/1998 |
| CA | 2640006 | 8/2007 |
| CN | 1158509 | 7/2004 |
| CN | 1970185 | 5/2007 |
| CN | 100359272 | 1/2008 |
| CN | 101437756 | 5/2009 |
| CN | 201680116 | 12/2010 |
| CN | 201748744 U | 2/2011 |
| CN | 102296714 | 5/2012 |
| CN | 102452522 | 5/2012 |
| CN | 102717578 A | 10/2012 |
| CN | 102720277 | 10/2012 |
| CN | 103072321 | 5/2013 |
| CN | 202973713 U | 6/2013 |
| CN | 203331442 | 12/2013 |
| CN | 104816478 A | 8/2015 |
| CN | 105115211 | 12/2015 |
| CN | 105115221 | 12/2015 |
| CN | 20463379 U | 1/2016 |
| CN | 2014963379 U | 1/2016 |
| DE | 1150190 | 6/1963 |
| DE | 4110292 A1 | 10/1992 |
| DE | 4409091 | 9/1995 |
| DE | 19818890 | 11/1999 |
| DE | 19914105 | 9/2000 |
| DE | 19915311 | 10/2000 |
| DE | 19948361 | 4/2001 |
| DE | 102008026528 A1 | 12/2009 |
| DE | 102009046810 | 5/2011 |
| DE | 102010024951 | 12/2011 |
| DE | 102011051178 A1 | 12/2012 |

(56) References Cited

FOREIGN PATENT DOCUMENTS

| | | |
|---|---|---|
| DE | 102012223536 | 6/2014 |
| DE | 102012223541 | 6/2014 |
| EP | 0260699 | 3/1988 |
| EP | 0480451 | 4/1992 |
| EP | 0645576 A1 | 3/1995 |
| EP | 0691518 | 1/1996 |
| EP | 0860669 | 8/1998 |
| EP | 1087186 | 3/2001 |
| EP | 1200785 | 5/2002 |
| EP | 1243880 | 9/2002 |
| EP | 1496322 | 1/2005 |
| EP | 1505359 | 2/2005 |
| EP | 1602425 A1 | 12/2005 |
| EP | 1624263 A2 | 8/2006 |
| EP | 1344008 | 9/2006 |
| EP | 1484563 | 10/2008 |
| EP | 1338854 | 12/2009 |
| EP | 2342511 | 8/2012 |
| EP | 2543942 A2 | 1/2013 |
| EP | 2607073 A2 | 6/2013 |
| EP | 2789951 | 10/2014 |
| EP | 2801774 | 11/2014 |
| EP | 2878427 A1 | 6/2015 |
| FR | 2980963 | 4/2013 |
| FR | 2991698 A1 | 12/2013 |
| GB | 837929 | 6/1960 |
| GB | 1214548 | 6/1960 |
| JP | 4828353 | 8/1973 |
| JP | 51057777 | 5/1976 |
| JP | 59191588 | 12/1984 |
| JP | 1318880 | 12/1989 |
| JP | 03013779 | 1/1991 |
| JP | 404165197 | 6/1992 |
| JP | 04165197 | 10/1992 |
| JP | 04309778 A | 11/1992 |
| JP | 06159922 | 6/1994 |
| JP | 7001479 | 1/1995 |
| JP | H07167377 A | 7/1995 |
| JP | 8145547 | 6/1996 |
| JP | 08300052 | 11/1996 |
| JP | H08303686 A | 11/1996 |
| JP | H09166271 A | 6/1997 |
| JP | 10113983 | 5/1998 |
| JP | 11159693 A | 6/1999 |
| JP | 11311395 | 11/1999 |
| JP | 11336990 | 12/1999 |
| JP | 2000097390 | 4/2000 |
| JP | 2000117334 | 4/2000 |
| JP | 2000320958 A | 11/2000 |
| JP | 2001038188 | 2/2001 |
| JP | 2001336691 A | 12/2001 |
| JP | 2001343176 | 12/2001 |
| JP | 2002068853 | 3/2002 |
| JP | 3438948 | 8/2003 |
| JP | 03478771 | 12/2003 |
| JP | 2001116437 A | 4/2004 |
| JP | 2004303695 | 10/2004 |
| JP | 2005069596 A | 3/2005 |
| JP | 2005098637 A | 4/2005 |
| JP | 2005114015 | 4/2005 |
| JP | 2005164193 | 6/2005 |
| JP | 2005256849 A | 9/2005 |
| JP | 2006077792 A | 3/2006 |
| JP | 2006161834 A | 6/2006 |
| JP | 2006161945 A | 6/2006 |
| JP | 03792801 | 7/2006 |
| JP | 2006200685 A | 8/2006 |
| JP | 2007263186 | 10/2007 |
| JP | 4111096 | 7/2008 |
| JP | 2008157431 A | 7/2008 |
| JP | 2008190815 | 8/2008 |
| JP | 2009063064 | 3/2009 |
| JP | 2009162402 | 7/2009 |
| JP | 2009524570 | 7/2009 |
| JP | 2010017437 | 1/2010 |
| JP | 2010071565 A | 4/2010 |
| JP | 2010108199 | 5/2010 |
| JP | 2010145002 | 7/2010 |
| JP | 04545126 B2 | 9/2010 |
| JP | 2010236770 | 10/2010 |
| JP | 2010276309 | 12/2010 |
| JP | 2011002033 | 1/2011 |
| JP | 2011069612 A | 4/2011 |
| JP | 04779684 | 9/2011 |
| JP | 2011196644 | 10/2011 |
| JP | 2012026493 | 2/2012 |
| JP | 04897473 | 3/2012 |
| JP | 2012063029 | 3/2012 |
| JP | 2013195009 A | 3/2012 |
| JP | 2012087993 | 5/2012 |
| JP | 2012163258 | 8/2012 |
| JP | 2012189114 | 10/2012 |
| JP | 2012242075 | 12/2012 |
| JP | 2013002484 | 1/2013 |
| JP | 2013050242 | 3/2013 |
| JP | 2013050267 A | 3/2013 |
| JP | 201076471 A | 4/2013 |
| JP | 2013076471 A | 4/2013 |
| JP | 2013088036 | 5/2013 |
| KR | 20020057547 | 7/2002 |
| KR | 20020080938 | 10/2002 |
| KR | 20030083812 | 11/2003 |
| KR | 20040000126 | 1/2004 |
| KR | 20050095357 A | 9/2005 |
| KR | 100620025 B1 | 9/2006 |
| KR | 1020070044024 | 4/2007 |
| KR | 1020070065743 A | 6/2007 |
| KR | 1020080103845 | 11/2008 |
| KR | 20090026045 | 3/2009 |
| KR | 1017776 | 2/2011 |
| KR | 20120007241 | 1/2012 |
| KR | 2012046621 | 5/2012 |
| KR | 2012051305 | 5/2012 |
| KR | 20150089495 A | 8/2015 |
| RU | 2061925 C1 | 6/1996 |
| RU | 2077411 C1 | 4/1997 |
| RU | 2081858 | 6/1997 |
| RU | 2132522 C1 | 6/1999 |
| RU | 2132522 C2 | 6/1999 |
| RU | 2162576 C2 | 1/2001 |
| RU | 2166158 C1 | 4/2001 |
| RU | 2187433 C2 | 8/2002 |
| RU | 2234645 C1 | 8/2004 |
| RU | 2252377 | 5/2005 |
| RU | 2253792 C2 | 6/2005 |
| RU | 2349618 C2 | 3/2009 |
| RU | 2414288 C2 | 3/2011 |
| RU | 2422598 | 6/2011 |
| RU | 142892 | 7/2014 |
| RU | 2529525 C1 | 9/2014 |
| RU | 2571031 | 12/2015 |
| SU | 203707 | 12/1967 |
| SU | 00476407 A1 | 7/1975 |
| SU | 547614 | 5/1977 |
| SU | 648780 A1 | 2/1979 |
| SU | 01307186 A1 | 4/1987 |
| WO | 9614207 A1 | 5/1996 |
| WO | 1996032605 | 10/1996 |
| WO | 9721767 | 6/1997 |
| WO | 1998049506 A1 | 11/1998 |
| WO | 02060576 A1 | 4/1999 |
| WO | 9614207 A1 | 4/1999 |
| WO | 9920961 A1 | 4/1999 |
| WO | 9920964 | 4/1999 |
| WO | 9920964 A1 | 4/1999 |
| WO | 199920964 | 4/1999 |
| WO | 1999030964 | 4/1999 |
| WO | 200160598 | 8/2001 |
| WO | 200202987 | 1/2002 |
| WO | 2002052208 | 4/2002 |
| WO | 02060576 A1 | 8/2002 |
| WO | 03072684 A1 | 9/2003 |
| WO | 03089729 | 10/2003 |
| WO | 2004010042 A1 | 1/2004 |

(56) References Cited

FOREIGN PATENT DOCUMENTS

| | | |
|---|---|---|
| WO | 2006045694 | 5/2006 |
| WO | 2006073540 A1 | 7/2006 |
| WO | 2006073540 A2 | 7/2006 |
| WO | 2006120183 | 11/2006 |
| WO | 2006120198 | 11/2006 |
| WO | 2007033836 A1 | 3/2007 |
| WO | 2007085511 | 8/2007 |
| WO | 2007106067 A2 | 9/2007 |
| WO | 2008065453 | 6/2008 |
| WO | 2008077741 | 7/2008 |
| WO | 2008118536 A2 | 10/2008 |
| WO | 2008122483 A2 | 10/2008 |
| WO | 2008122483 A2 | 10/2008 |
| WO | 2009013106 A2 | 1/2009 |
| WO | 2009112433 A1 | 9/2009 |
| WO | 2009147106 | 12/2009 |
| WO | 2010007783 A1 | 1/2010 |
| WO | 2010029730 | 3/2010 |
| WO | 2010043009 | 4/2010 |
| WO | 2010092627 | 8/2010 |
| WO | 2010127947 | 11/2010 |
| WO | 2010127947 A2 | 11/2010 |
| WO | 2011003711 | 1/2011 |
| WO | 2011058678 | 5/2011 |
| WO | 2011058678 A1 | 5/2011 |
| WO | 2011081498 | 7/2011 |
| WO | 2010007783 A1 | 1/2012 |
| WO | 2012023705 | 2/2012 |
| WO | 2012026715 | 3/2012 |
| WO | 2012031885 | 3/2012 |
| WO | 2012043990 A3 | 6/2012 |
| WO | 2012044001 A3 | 6/2012 |
| WO | 2012119892 | 9/2012 |
| WO | 2012152646 | 11/2012 |
| WO | 2012085212 A9 | 7/2013 |
| WO | 2013116103 | 8/2013 |
| WO | 2013116302 | 8/2013 |
| WO | 2014038150 A1 | 3/2014 |
| WO | 2014095542 | 6/2014 |
| WO | 2014121893 A1 | 8/2014 |
| WO | 2014184393 | 11/2014 |
| WO | 2014184393 A1 | 11/2014 |
| WO | 2013140816 A1 | 8/2015 |
| WO | 2016082907 A1 | 6/2016 |
| WO | 2017029782 A1 | 2/2017 |

OTHER PUBLICATIONS

BASF, "Balindur™ Solutions for fixing Vaccum Insulated Panels," web page, 4 pages, date unknown, http://performance-materials.basf.us/products/view/family/balindur, at least as early as Dec. 21, 2015.

BASF, "Balindur™," web page, 2 pages, date unknown, http://product-finder.basf.com/group/corporate/product-finder/en/brand/BALINDUR, at least as early as Dec. 21, 2015.

PU Solutions Elastogram, "Balindur™ masters the challenge," web page, 2 pages, date unknown, http://product-finder.basf.com/group/corporate/product-finder/en/literature-document:/Brand+Balindur-Flyer--Balindur+The+new+VIP+fixation+technology-English.pdf, Dec. 21, 2014.

Cai et al., "Generation of Metal Nanoparticles By Laser Ablation of Microspheres," J. Aerosol Sci, vol. 29, No. 5/6 (1998), pp. 627-636.

Raszewski et al., "Methods For Producing Hollow Glass Microspheres," Powerpoint, cached from Google, Jul. 2009, 6 pages.

\* cited by examiner

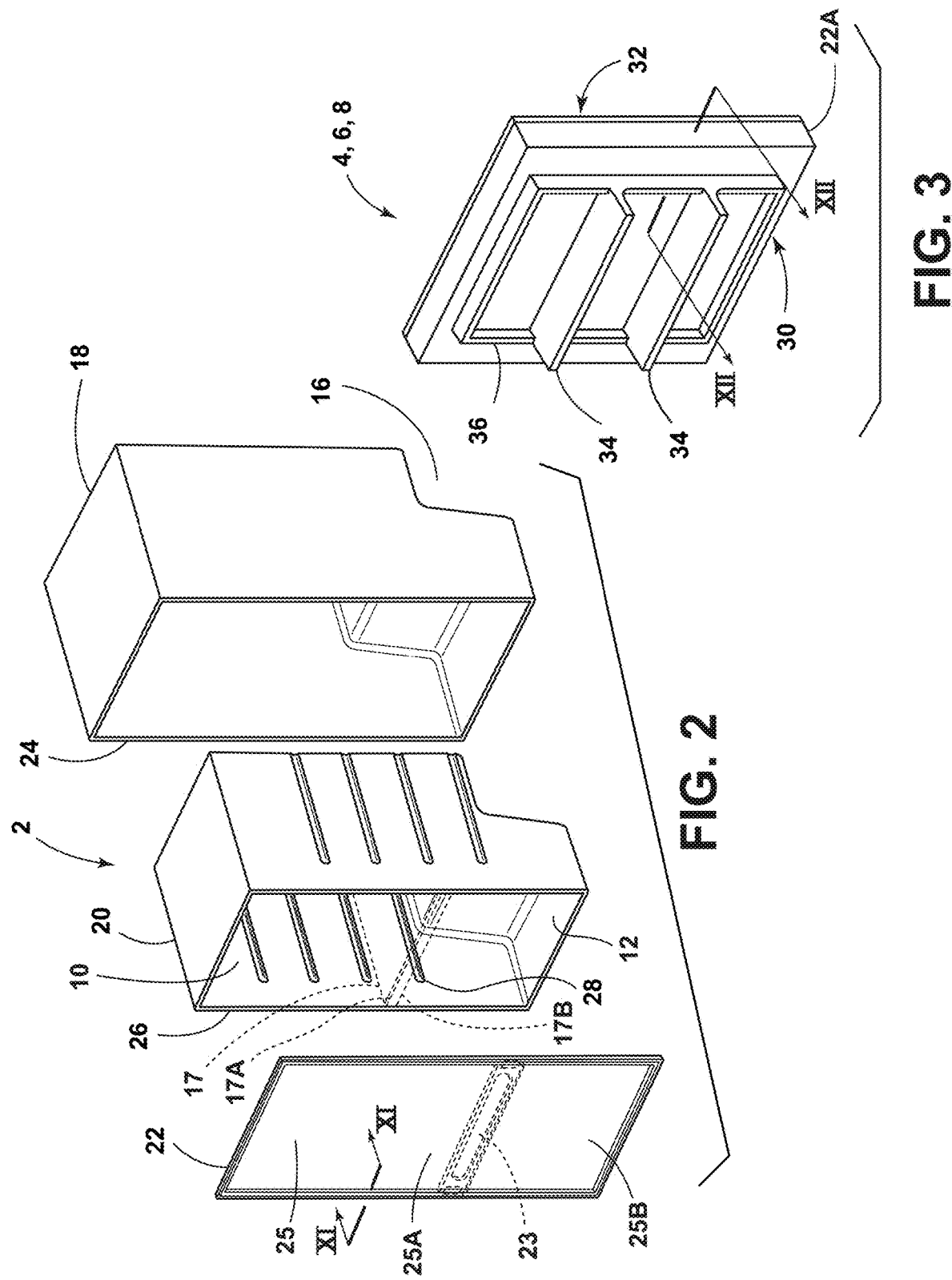

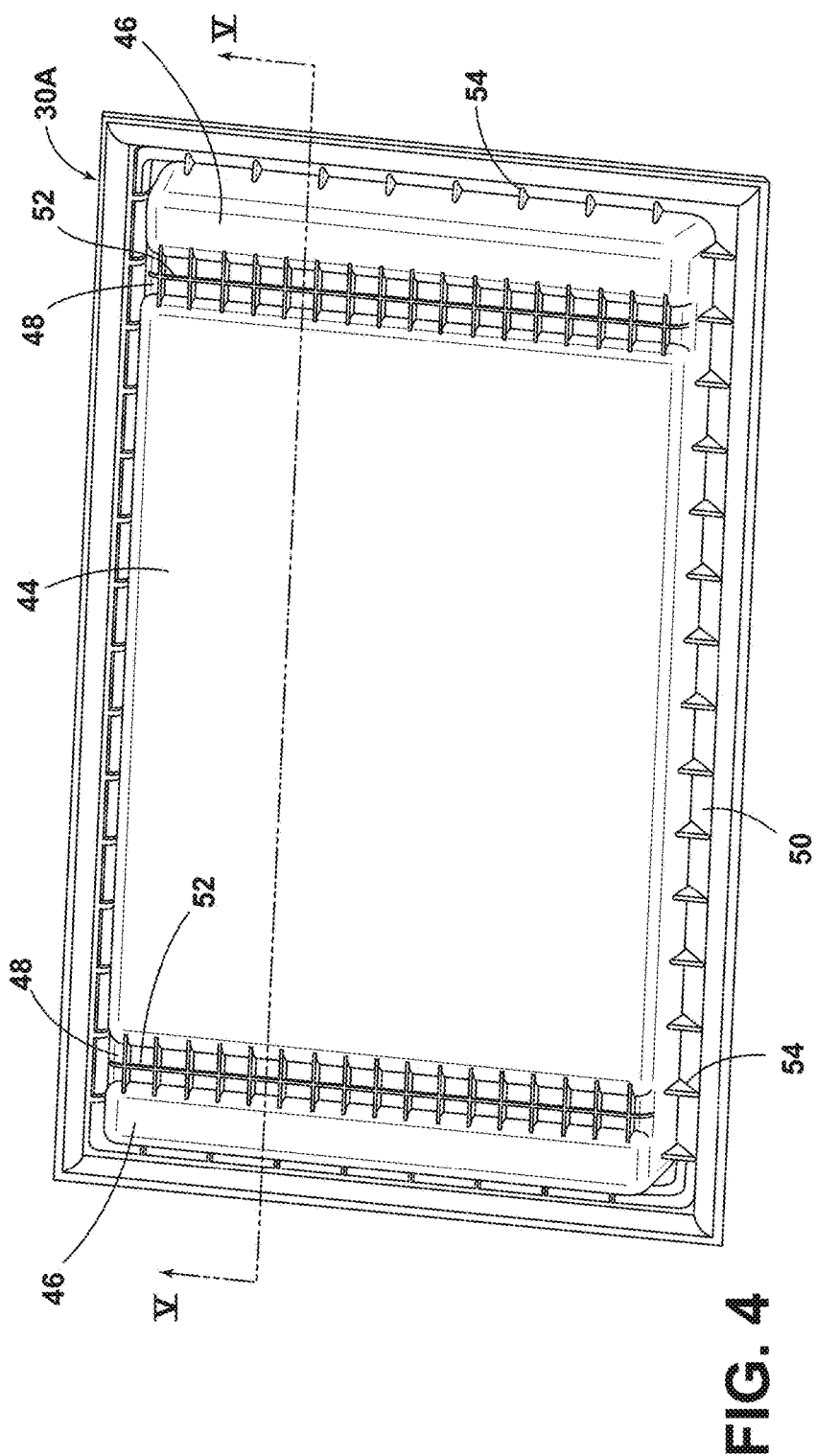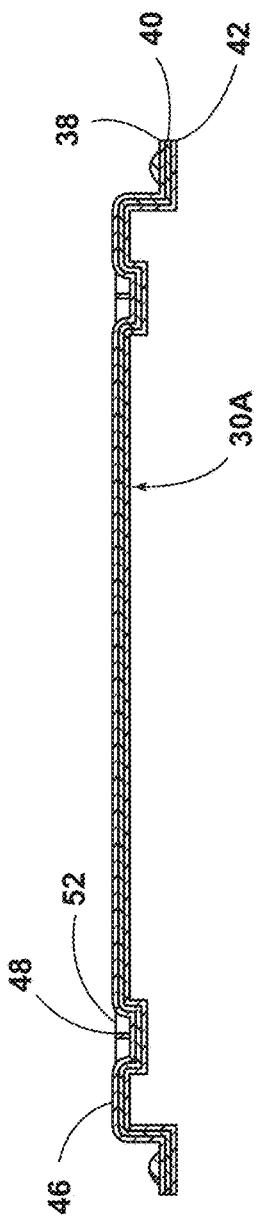
FIG. 4
FIG. 5

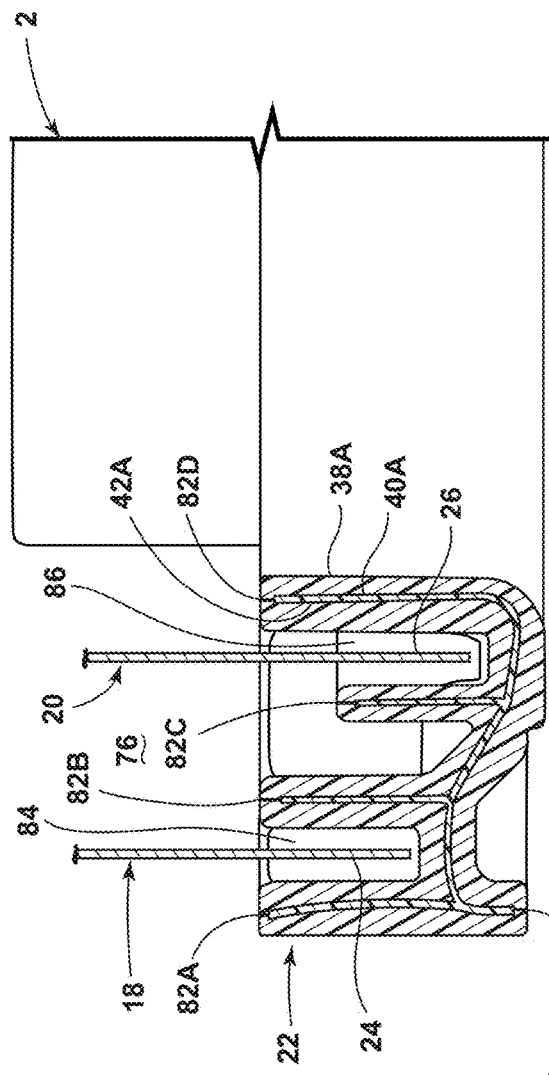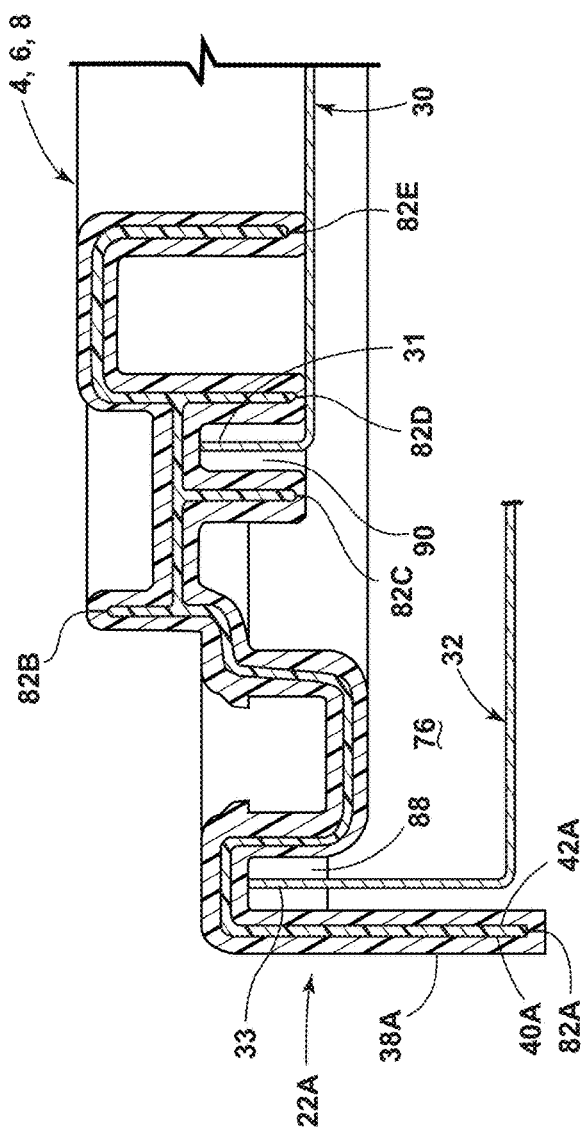

MOLDED GAS BARRIER PARTS FOR VACUUM INSULATED STRUCTURE

CROSS REFERENCE TO RELATED APPLICATION

The present application is a division of U.S. patent application Ser. No. 16/016,102, filed Jun. 22, 2018, and entitled "MOLDED GAS BARRIER PARTS FOR VACUUM INSULATED STRUCTURE," now U.S. Pat. No. 10,807,298, issued Oct. 30, 2020, which is a continuation-in-part of U.S. patent application Ser. No. 14/982,652, filed Dec. 29, 2015, and entitled "INJECTION MOLDED GAS BARRIER PARTS FOR VACUUM INSULATED STRUCTURE," now U.S. Pat. No. 10,030,905, issued Jul. 24, 2018, the entire disclosures of which are incorporated herein by reference.

BACKGROUND OF THE INVENTION

Various types of vacuum insulated refrigerator cabinets and doors have been developed. However, known methods of fabricating vacuum insulated structures may suffer from various drawbacks.

SUMMARY OF THE INVENTION

One aspect of the present invention is a method of fabricating a vacuum insulated appliance structure. The method includes injecting a first layer of a first thermoplastic polymer material. A second layer of a second thermoplastic polymer material is injection molded over at least a portion of the first layer, and a third layer of a third thermoplastic polymer material is injection molded over at least a portion of the second layer to form an elongated trim breaker. The elongated trim breaker includes first and second elongated channels. The method includes inserting an edge portion of a wrapper into the first channel, and inserting an edge portion of a liner into the second channel to form a vacuum cavity. The vacuum cavity is filled with a porous material, and the vacuum cavity is evacuated. At least one of the first, second, and third polymer materials is impervious to at least one atmospheric gas. The second layer may be thinner than the first and third layers, and the second layer may comprise EVOH (Ethylene Vinyl Alcohol) or LCP (Liquid Crystal Polymer). One or both of the first and third layers may comprise one or more of a nylon, a co-polyester, HIPS (High Impact Polystyrene), PVC (Polyvinyl Chloride), or PET (Polyethylene Terephthalate) material. The wrapper and liner may comprise sheet metal, or polymer structures having first, second, and third layers formed by injection molding in a manner that is similar to the injection molding process used to form the elongated trim breaker. The wrapper and liner may comprise refrigerator cabinet members, refrigerator door components, or other vacuum insulated structures.

Another aspect of the present invention is a method of fabricating a vacuum insulated appliance structure. The method includes molding a first layer of a first thermoplastic polymer material. A second layer of a second thermoplastic polymer material is molded over at least a portion of the first layer. The second material is selected from the group consisting of EVOH and LCP. A third layer of a third thermoplastic polymer material is molded over at least a portion of the second layer to form a first component. The method includes securing a second component to the first component to form a vacuum cavity therebetween. The vacuum cavity is filled with a filler material, and the vacuum cavity is evacuated. The first and third layers may comprise materials selected from the group consisting of PVC, PET, HIPS, a co-polyester and nylon. At least one of the first and third layers may include a structural reinforcement of increased thickness that is formed during the molding process. The vacuum insulated appliance structure may comprise a refrigerator cabinet, refrigerator door, or other appliance or refrigerator component. One or more of the first, second, and third layers may be molded utilizing an injection molding process.

These and other features, advantages, and objects of the present disclosure will be further understood and appreciated by those skilled in the art by reference to the following specification, claims, and appended drawings.

BRIEF DESCRIPTION OF THE DRAWINGS

FIG. 2 is an exploded isometric view of a refrigerator cabinet;

FIG. 3 is an isometric view of a refrigerator door;

FIG. 4 is an isometric view of a door liner showing the inner side of the door liner;

FIG. 5 is a cross sectional view of the door liner of FIG. 4 taken along the line V-V;

FIG. 11 is a cross sectional view of the trim breaker of FIG. 2 taken along the line XI-XI; and FIG. 12 is a cross sectional view of the trim breaker of FIG. 3 taken along the line XII-XII.

DETAILED DESCRIPTION

Figure 1:
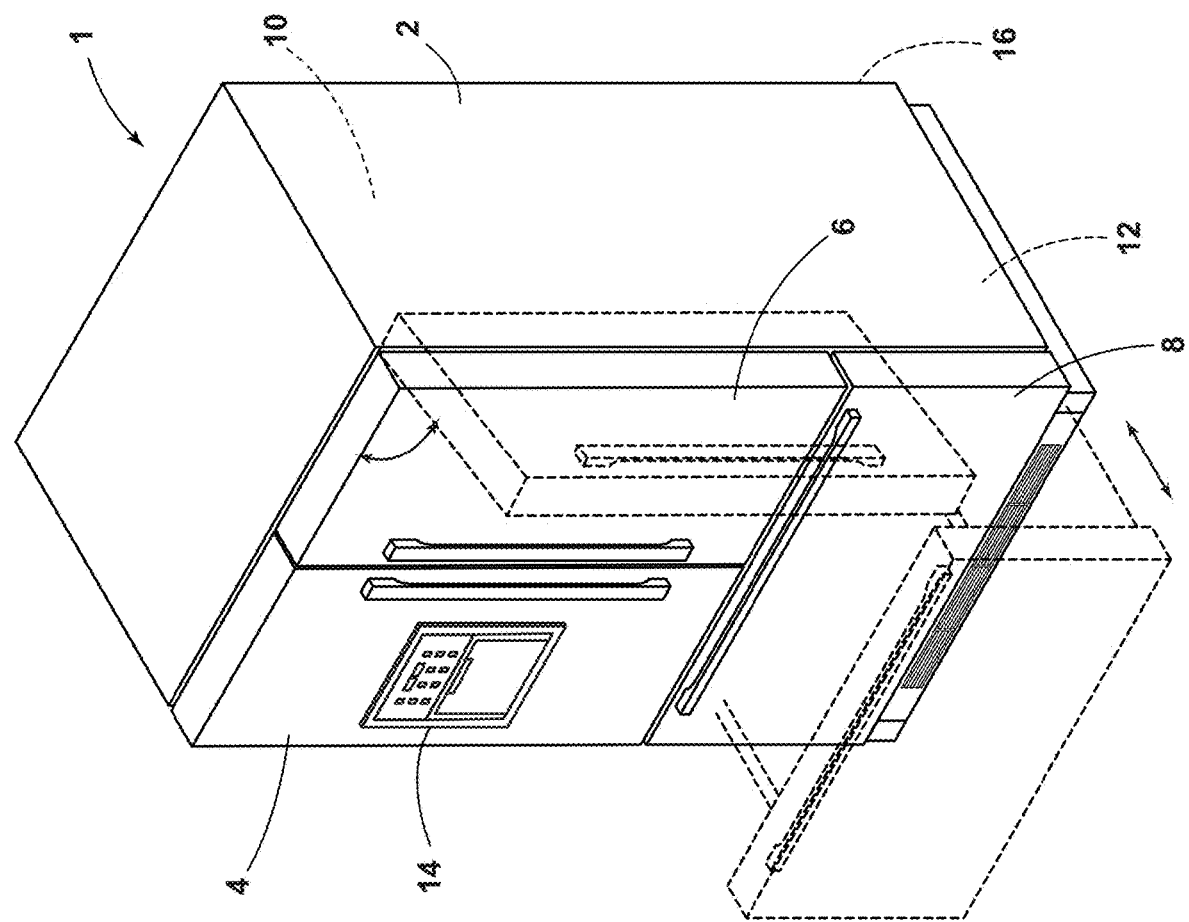
FIG. 1 is an isometric view of a refrigerator.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations and step sequences, except where expressly specified to the contrary. It is also to be understood that the specific devices and processes illustrated in the attached drawings, and described in the following specification, are simply exemplary embodiments of the concepts defined in the appended claims. Hence, specific dimensions and other physical characteristics relating to the disclosures herein are not to be considered as limiting, unless the claims expressly state otherwise.

With reference to FIG. 1, a refrigerator 1 may include a vacuum insulated cabinet structure 2, and one or more doors 4 and 6 that are movably mounted to the cabinet 2. The cabinet 2 may include an insulated fresh food compartment 10 that is accessible by opening doors 4 and 6, and a frozen food compartment 12 that can be accessed by opening drawer 8. Refrigerator 1 may include an interior partition 17 (FIG. 2) to separate compartments 10 and 12. Partition 17 may be integrally formed with liner 20. For example, liner 20 may comprise a two piece structure with separate upper and lower components, with an upper horizontal (planar) side wall 17A of the lower component being positioned adjacent a lower horizontal (planar) side wall 17B of the upper component to form partition 17. Refrigerator 1 may also include an ice/water dispenser 14 mounted to door 4. Refrigerator 1 includes a cooling system (not shown) that may be mounted in a machine space 16 (see also FIG. 2) located in a lower rear portion of the refrigerator 1. The cooling system may comprise a compressor, condenser, evaporator, and other related components. Alternatively, the cooling system may comprise a thermoelectric system that utilizes thermoelectric elements.

With further reference to FIG. 2, cabinet 2 may comprise an outer wrapper 18 and an inner liner 20 that fits within the wrapper 18 when assembled. A trim breaker 22 may be utilized to seal front edge 24 of wrapper 18 to front edge 26 of liner 20. Trim breaker 23 may include an integrally formed cross part 23 extending over interior partition 17. The wrapper 18 and/or liner 20, and/or trim breaker 22 may comprise multi-layer polymer structures that are impervious to atmospheric gasses such as oxygen, nitrogen, carbon dioxide, water vapor, and/or other gasses. These multi-layer structures may be formed utilizing a multistep injection molding process discussed below. Alternatively, only one or two of the components 18, 20, and 22 may be fabricated utilizing a multistep injection process. For example, wrapper 18 could comprise formed sheet metal, and liner 20 and trim breaker 22 could comprise a multilayer polymer structure. Also, one or more (or all) of the components 18, 20 and 22 may be formed utilizing a thermoforming process. Trim breaker 22 is preferably formed from one or more materials (e.g. polymers) having low thermal conductivity to thermally isolate liner 20 from wrapper 18. Various features such as ribs or raised portions 28 may be formed in liner 20, wrapper 18, and/or trim breaker 22 during the injection molding process as described in more detail below. As discussed in more detail below, the liner 20 and exterior wrapper 18 form an interior space or cavity between liner 20 and wrapper 18 when assembled, and the interior cavity is filled with a porous material. The cavity is then evacuated to form a vacuum insulated structure.

With further reference to FIG. 3, the doors 4 and 6 and/or drawer 8 may include a liner 30, a trim breaker 22A (see also FIG. 12) and an exterior wrapper or panel 32. The door liner 30 and exterior wrapper 32 may comprise multi-layer polymer structures that are impervious to gasses. These structures may be fabricated according to a process discussed below. Liner 30 may comprise shelves 34, raised reinforcing features 36, or other such three dimensional features that are formed during an injection molding process. Alternatively, the door liner 30 and/or wrapper 32 may be formed from sheet metal. If door liner 30 is formed from sheet metal, it may have a generally planar configuration that does not include shelves 36 or other such complex three dimensional features.

With further reference to FIGS. 4 and 5, a liner 30A includes first, second, and third layers of polymer material 38, 40, and 42, respectively. The first layer 38 may form an interior side 44 of liner 30A. Layer 38 may include raised portions 46, grooves or lower portions such as linear channels 48, a perimeter channel 50, and reinforcing ribs 52 and 54 that extend across the grooves 48 and perimeter channel 50, respectively. As discussed below, a molding process (e.g. injection molding) according to the present disclosure provides for formation of complex three dimensional features such as raised portions 46, grooves and channels 48 and 50, respectively, and ribs 52 and 54, respectively.

In a liner, wrapper, trim breaker, or other component having a first material combination, the first layer 38 and third layer 42 may comprise a nylon thermoplastic material, and the second layer 40 may comprise a relatively thin layer of Ethylene Vinyl Alcohol (EVOH) or Liquid Crystal Polymer (LCP). According to another aspect of the present disclosure, a second material combination of a liner 30A or other component (e.g., wrapper or trim breaker) may include a first layer 38 and third layer 42 that comprise a High Impact Polystyrene (HIPS), and the second layer 40 may comprise a relatively thin layer of a barrier material such as EVOH or LCP. Typically, second layer 40 is just thick enough to provide an effective barrier (e.g. to oxygen), but second layer 40 is typically significantly thinner than layers 38 and 42 to thereby minimize the amount of the barrier material (layer 40) of the multilayer structure. In general, EVOH is a good barrier to oxygen, but it is not a particularly good barrier with respect to water vapor. Accordingly, one or both of the layers 38 and/or 42 may comprise a material that provides a water vapor barrier. For example, layer 38 and/or layer 42 could comprise barrier nylon or a liquid crystal polymer (LCP). An optional fourth layer 44A or 44B (FIG. 6) of material such as Tetrafluoroethylene (THV), Polychlorotrifluoroethylene (PCTFE), Cyclic Olefin Copolymer (COC), Cyclic Olefin Polymer (COP) or High Density Polyethylene (HDPE) providing a water vapor barrier may be injection molded between layers 38 and 40 or between layers 40 and 42. One or both layers 38 and 42 may comprise one or more of nylon, HIPS, PVC, PET, or a co-polyester and layer 40 may comprise one or more of EVOH or LCP.

In general, the materials utilized to form layers 38, 40, 42 and/or additional layers may be chosen to provide specific barrier properties with respect to oxygen transmission, water vapor transmission, structural properties, and cost considerations. It will be understood that an insulated structure may comprise various components such as a wrapper, liner, and trim breaker, each having layers of substantially identical materials or the components may comprise layers of different materials. For example, a component such as a cabinet or door may have a liner and/or a trim breaker comprising the first material combination discussed above, and a wrapper comprising the second material combination discussed above. Layer 38 may have a thickness of about 0.5 mm to about 3.0 mm, layer 40 may have a thickness of about 0.05 mm to about 0.5 mm, and layer 42 may have a thickness of about 0.5 mm to about 3.0 mm. In general, optional layers 44A or 44B have a thickness selected to provide a water vapor barrier as required for a particular application. However, it will be understood that the layers may have virtually any thickness, and one or more of the layers may have regions of increased or decreased thickness.

Figure 6:
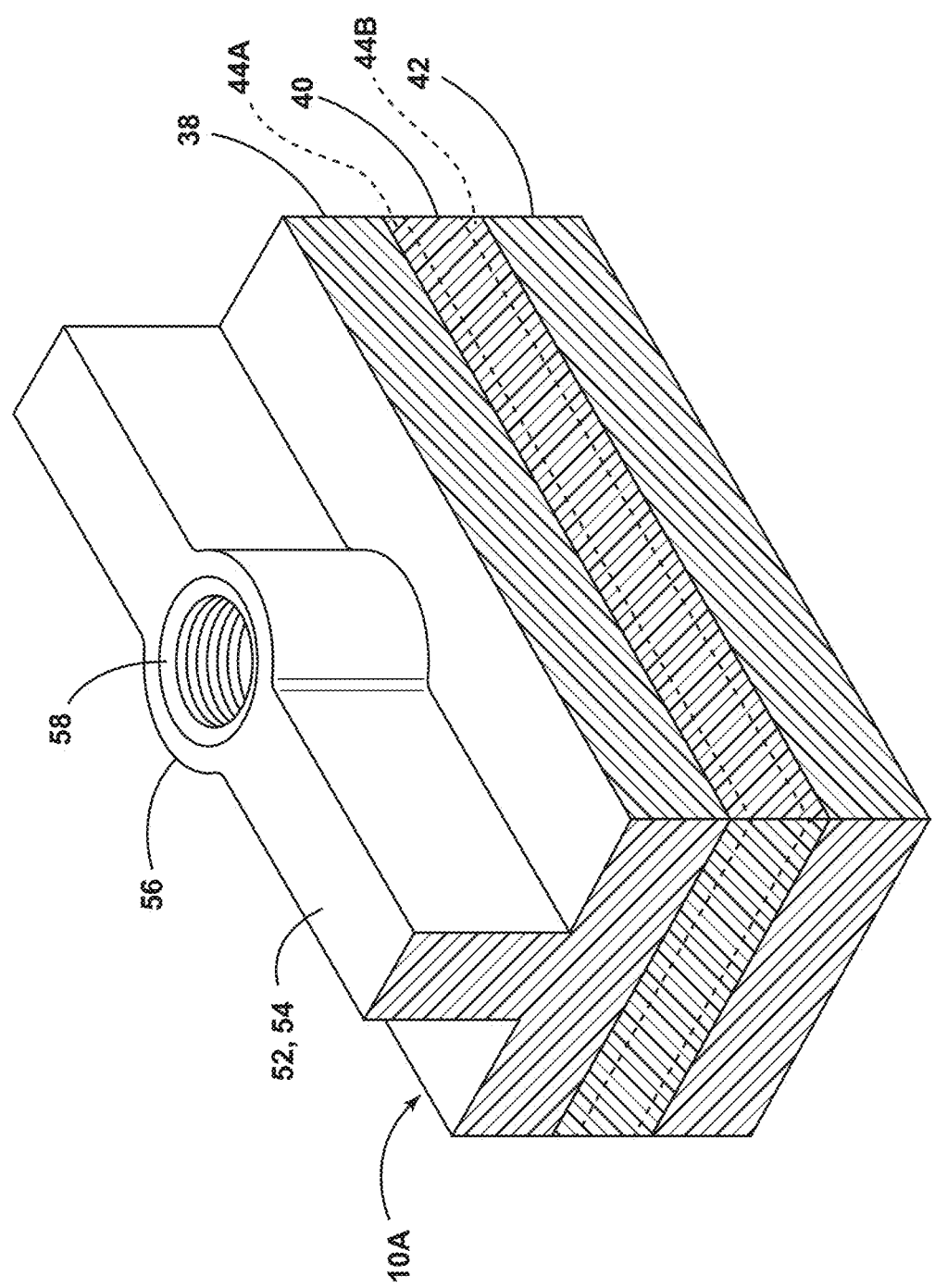
FIG. 6 is a partially fragmentary isometric view showing an injection molded structural reinforcement feature.

With further reference to FIG. 6, the component 10A may be molded to include additional structural features such as a screw boss 56 that receives a threaded insert 58. The ribs 52, 54 and/or screw boss 56 or other such features may be formed by injection molding at the time first and/or third layers 38 and 42 are being formed. It will be understood that a wide range of three dimensional features may be formed during the injection molding process whereby layer 38 and/or 42 have a non-uniform thickness.

Figure 7:
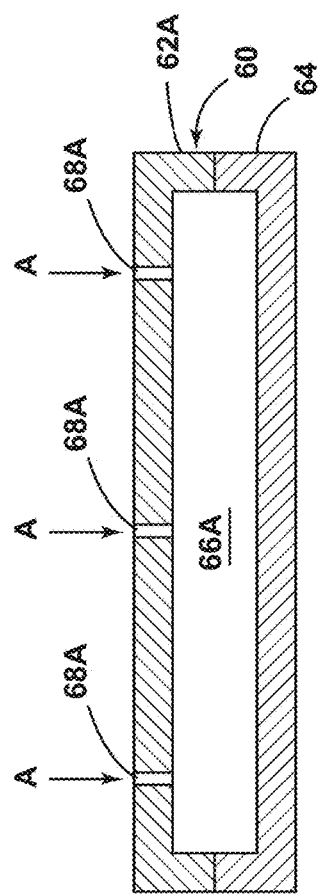
FIG. 7 is a partially schematic view of a mold utilized for a first injection.
Figure 8:
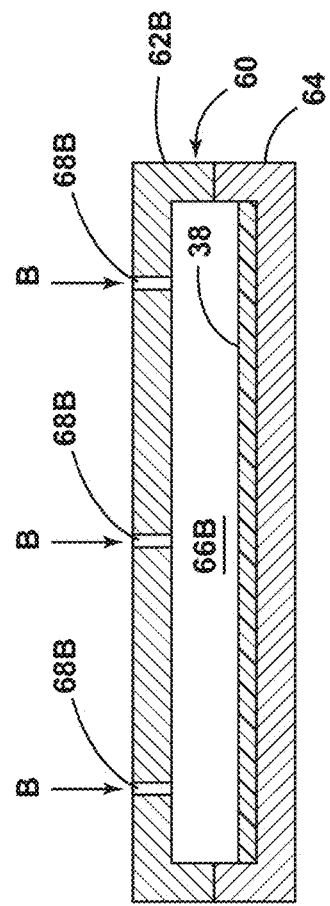
FIG. 8 is a partially schematic view of a mold utilized for a second injection.
Figure 9:
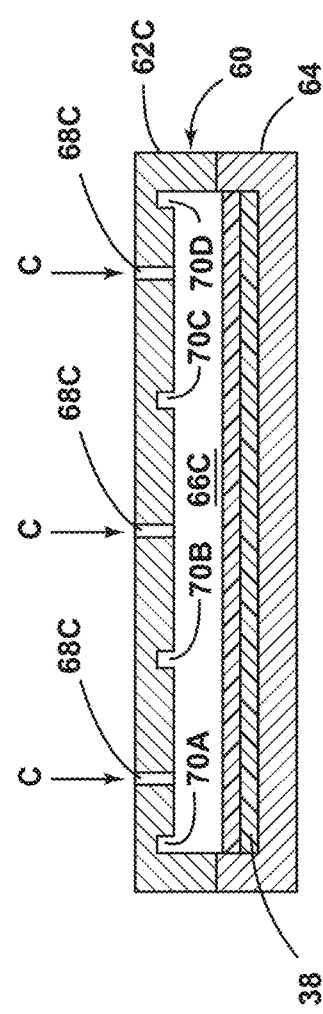
FIG. 9 is a partially schematic view of a mold utilized for a third injection.

With further reference to FIGS. 7-9, a molding tool 60 includes a lower mold part 64, and first, second, and third upper parts 62A, 62B, and 62C, respectively. During a first molding step (FIG. 7), molten polymer material is injected through ports 68A in mold part 62A as shown by the arrows "A." The molten material flows into a first mold cavity 66A defined by mold parts 62A and 64 to form a first layer 38 (FIG. 8). After the first polymer material is injected, additional polymer material is injected through ports 68B as shown by the arrows "B" (FIG. 8) to fill a second cavity 66B defined by mold tools 62B and 64 to form a second layer 40 (FIG. 9) that extends over at least a portion of first layer 38. With further reference to FIG. 9, a third polymer material is then injected through ports 68C of mold part 62C as shown by the arrows "C" to fill cavity 66C and form a third layer 42 (see also FIGS. 5 and 6). The mold part 62C may include one or more cavities or other features 70A-70D that form ribs 52, 54 and/or screw bosses 56 and/or other such 3D features whereby the component formed by the tooling/process of FIGS. 7-9 has a non-uniform thickness. The mold part 64 may also include one or more cavities or other such features that are similar to the features 70A-70D to thereby form three dimensional features in first layer 38. The layers 38, 40, 42 may comprise one or more of the thermoplastic polymer materials discussed above. For example, layers 38 and/or 42 may comprise one or more of nylon, a co-polyester, LCP, HIPS, or PVC, and layer 40 may comprise one or more of EVOH, LCP, or other suitable barrier material. It will be understood that a fourth layer 44A (FIG. 6) of material such as THV, PCTFE, COC, COP, or HDPE may be injection molded over first layer 38, and layer 40 may be molded over the fourth layer 44A. Alternatively, a fourth layer 44B may be molded over layer 40, and layer 42 may then be molded over the fourth layer 44B. It will be understood that molding over is not necessarily limited to molding layers or other features on top of or above another layer, but rather broadly describes molding two or more different materials together. For example, the mold parts 62A, 62B, 62C, and 64 of FIGS. 7-9 could have virtually any orientation or configuration, and mold tools/parts 62A, 62B and 62C do not necessarily need to be above mold tool/part 64.

Figure 10:
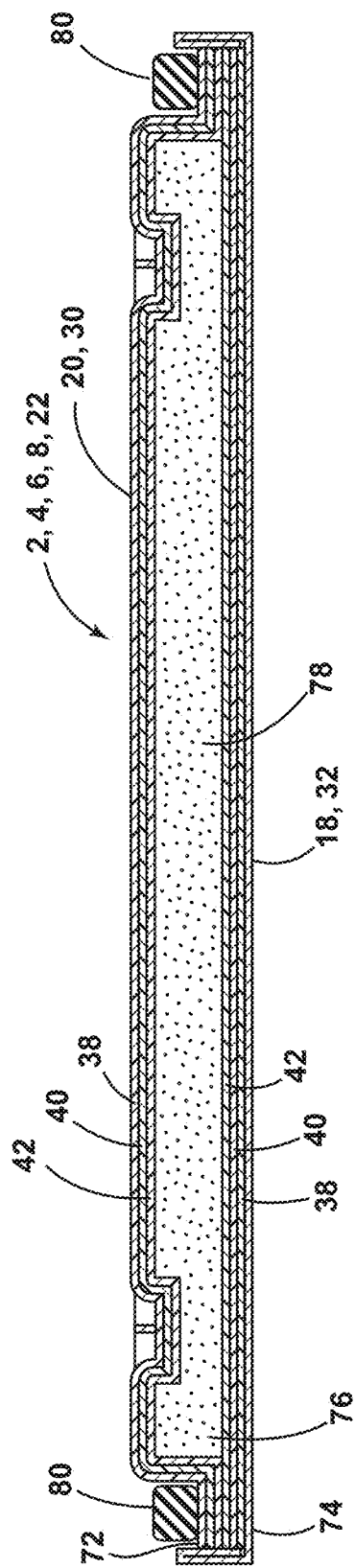
FIG. 10 is a cross sectional view of a vacuum insulated refrigerator structure according to one aspect of the present invention.

With further reference to FIG. 10 a vacuum insulated refrigerator structure such as a cabinet 2, doors 4, 6, and/or drawer 8, and/or a trim breaker 22 may include an outer component such as wrapper 18 or exterior panel 32, and an interior liner 20 or 30. The components 18, 20, 30, and/or 32 may comprise three or more layers of polymer material 38, 40, and 42 that are configured to provide a barrier to gas as discussed above. For example, one or both layers 38 and 42 may comprise one or more of nylon, a co-polyester, HIPS, PVC, and layer 40 may comprise one or more of EVOH or LCP. The components 18, 20, 30, and 32 may have substantially identical construction (i.e., the same polymer material layers), or the components 18, 20, 30, and 32 may comprise different polymer materials forming layers 38, 40, 42.

During assembly, perimeter edge portions or flanges 72 and 74 of the wrapper 18 and liner 20 are sealed together to form an interior space 76. A trim breaker 22 (FIG. 2) or trim breaker 22A (FIG. 3) may optionally be used to physically interconnect the perimeters of wrapper 18 and liner 20 and to thermally isolate wrapper 18 from liner 20 to reduce heat transfer from wrapper 18 to liner 20 and visa-versa. The interior space 76 is then filled with silica powder 78 or other suitable material, and a vacuum is formed in the interior space 76. The vacuum may be formed by placing the assembled structure in a vacuum chamber (not shown), and an access opening or port in wrapper 18 and/or liner 20 may then be closed and sealed to seal off interior space 76. The assembly is then removed from the vacuum chamber. Once the interior space 76 is sealed, the vacuum assembly forms a vacuum insulated refrigerator structure such as cabinet 2, doors 4, 6, drawer 8, or other such refrigerator structure. If the structure comprises a refrigerator cabinet 2, a trim breaker 22 may be utilized to seal edge 24 of wrapper 18 to edge 26 of liner 20 as discussed above in connection with FIG. 2. If the vacuum insulated refrigerator structure comprises a door, a resilient seal strip 80 or the like may be positioned adjacent edge portions 72 and 74 to thereby seal the door 4 or 6 (or drawer 8) when in a closed position.

With further reference to FIG. 11, trim breaker 22 may comprise a first layer 38A, a second layer 40A, and a third layer 42A. The layers 38A, 40A, and 42A may be formed utilizing an injection molding process as discussed above in connection with FIGS. 7-9. In a preferred embodiment, first layer 38A and third layer 42A are formed from the same polymer material. The layers 40A and 42A may be formed from a co-polyester, PVC, PET, nylon, or HIPS. Second layer 40A comprises a barrier layer that may be formed from EVOH, LCP, or other material that is impervious or substantially impervious to oxygen permeation. The polymer material (e.g. PVC or PET) of the layers 38A and 42A protect the inner layer 40A from moisture. It will be understood that the layers 38A and 42A may melt together in the regions 82A-82E to thereby encapsulate the second or inner layer 40A. Thus, if the layers 38A and 42A comprise the same polymer material, the outer layers 38A and 42A may form a substantially continuous one piece outer structure that completely encapsulates the inner barrier layer 40A.

Trim breaker 22 includes a first elongated channel 84, and a second elongated channel 86. An edge portion 26 of wrapper 18 is received in channel 84, and edge portion 26 of liner 20 is received in channel 86. The channels 84 and 86 may be filled with an adhesive/sealant (not shown) such as silicone, epoxy, or other suitable material to secure the trim breaker 22 to the wrapper 18 and liner 20, and to ensure that the interior space 76 is sealed whereby a vacuum can be formed in the interior space 76. As discussed above, the wrapper 18 and/or liner 20 may be formed from sheet metal or other suitable material. For example, wrapper 18 may comprise sheet metal, and liner 20 may comprise polymer layers 38, 40, 42. As shown in FIG. 11, first and second channels 84 and 86 may face in substantially the same direction, and the channels 84 and 86 may extend substantially parallel to one another. Referring again to FIG. 2, the channels 84 and 86 may extend around substantially the entire perimeter of trim breaker 22 (FIG. 2) and along cross member 23 if trim breaker 22 includes a cross member 23. Trim breaker 22 preferably comprises a one piece continuous ring forming an enlarged central opening 25. Opening 25 may include an upper portion 25A and a lower portion 25B if trim breaker 22 includes a cross structure 23.

Trim breaker 22 provides an airtight seal that is substantially impervious to water vapors and/or other gasses to thereby permit a vacuum to be maintained in the interior space 76. Also, because the trim breaker 22 is formed from polymer materials having relatively low thermal conductivity, very little heat is transferred from wrapper 18 to liner 20 and vise-versa.

With further reference to FIG. 12, a trim breaker 22A may be utilized in a door 4, 6, or 8 (see also FIG. 3). Trim breaker 22A includes layers 38A, 40A, and 42A that may be constructed from substantially the same materials as discussed above in connection with the trim breaker 22 of FIG. 11. Trim breaker 22A includes a first channel 88 that receives an edge portion 33 of door wrap 32. Trim breaker 22A also includes a second channel 90 that includes an edge portion 31 of a door liner 30. The channels 88 and 90 may be filled with an adhesive/sealant to ensure that the edges 31 and 33 of liner 30 and wrapper 32, respectively, are sealed and secured to the trim breaker 22A. Channels 88 and 90 may face in substantially the same direction as shown in FIG. 12, and extend parallel around the perimeter of a door 4, 6, 8, etc. to form a ring-like or "picture frame" structure. Trim breaker 22A is impervious to air, water vapor, and/or other gasses to enable the formation of an airtight vacuum in interior space 76. Trim breaker 22A is preferably made from polymer materials having a low coefficient of thermal conductivity to thereby thermally insulate the door liner 30 from the door wrap 32. As discussed above, door liner 30 and door wrap 32 may be made from metal or multi-layer polymer materials.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vacuum insulated appliance structure, comprising: a first component having first and third layers molded to opposite sides of a second layer; wherein the first layer comprises a first thermoplastic polymer material; wherein the second layer comprises a second thermoplastic polymer material, and wherein the second thermoplastic polymer material is selected from the group consisting of EVOH and LCP; wherein the third layer comprises a third thermoplastic polymer; wherein a portion of the first layer is in direct contact with a portion of the third layer such that the first and third layers form a continuous one piece outer structure that completely encapsulates the entire second layer inside the outer structure; a second component secured to the first component to form a cavity therebetween; porous filler material disposed in the cavity wherein the cavity is evacuated to form a vacuum; and wherein the first and third layers comprise materials selected from the group consisting of PVC, PET, HIPS, a co-polyester, and nylon.

2. The vacuum insulated appliance structure of claim 1, wherein:
portions of the first and third layers are in direct contact with each other and form a seal along an edge of the second layer.

3. The vacuum insulated appliance structure of claim 2, wherein:
the portions of the first and third layers that are melted together to form the seal along the edge of the second layer.

4. The vacuum insulated appliance structure of claim 1, wherein:
at least a portion of the one piece outer structure extends transversely across an edge of the second layer and completely covers the edge of the second layer such that the edge of the second layer is not exposed.

5. A vacuum insulated appliance structure comprising: a first component having first and third layers molded to opposite sides of a second layer: wherein the first layer comprises a first thermoplastic polymer material: where the second layer comprises a second thermoplastic polymer material, and wherein the second thermoplastic polymer material is selected from the group consisting of EVOH and LCP; wherein the third layer comprises a third thermoplastic polymer; wherein the first and third layer from a continuous one piece outer structure that completely encapsulates the second layer; a second component secured to the first component to form a cavity therebetween, wherein the second component comprise a wrapper sealingly connected to the first component; porous filler material disposed in the cavity wherein the cavity is evacuated to form a vacuum; and wherein the first and third layers comprise materials selected from the group consisting of PVC, PET, HIP, a co-polyester, and nylon; and including a liner sealingly connected to the first component, wherein the liner is spaced apart from the wrapper to form an edge gap, and wherein the first component comprises a trim breaker that spans the edge gap.

6. The vacuum insulated appliance structure of claim 5, wherein:
at least one of the wrapper and the liner are metal.

7. A vacuum insulated appliance structure, comprising:
a first component having first and third layers molded to opposite sides of a second layer;
wherein the first layer comprises a first thermoplastic polymer material;
wherein the second layer comprises a second thermoplastic polymer material, wherein the second thermoplastic polymer material is selected from the group consisting of EVOH and LCP;
wherein the third layer comprises a third thermoplastic polymer;
wherein the first and third layers comprise materials selected from the group consisting of PVC, PET, HIPS, a co-polyester, and nylon;
a wrapper sealingly connected to the first component;
a liner sealingly connected to the first component, wherein the liner is spaced apart from the wrapper to form an edge gap, and wherein the first component comprises a trim breaker that spans the edge gap, the wrapper, liner, and trim breaker forming a cavity;
porous filler material disposed in the cavity, and wherein the cavity is evacuated to form a vacuum.

8. The vacuum insulated appliance structure of claim 7, wherein:
at least one of the wrapper and the liner are metal.

* * * * *